(12) United States Patent
Sung et al.

(10) Patent No.: US 10,808,820 B2
(45) Date of Patent: Oct. 20, 2020

(54) TORQUE CONVERTER FOR VEHICLE

(71) Applicant: Valeo Kapec Co., Ltd, Daegu (KR)

(72) Inventors: Sanghyun Sung, Daegu (KR); Wan Choi, Daejeon (KR); Soon Cheol Shin, Suwon-si (KR)

(73) Assignee: Valeo Kapec Co., Ltd, Daegu (KR)

( * ) Notice: Subject to any disclaimer, the term of this patent is extended or adjusted under 35 U.S.C. 154(b) by 0 days.

(21) Appl. No.: 16/302,714

(22) PCT Filed: Jul. 13, 2016

(86) PCT No.: PCT/KR2016/007587
§ 371 (c)(1),
(2) Date: Nov. 19, 2018

(87) PCT Pub. No.: WO2017/204403
PCT Pub. Date: Nov. 30, 2017

(65) Prior Publication Data
US 2019/0120360 A1    Apr. 25, 2019

(30) Foreign Application Priority Data

May 25, 2016    (KR) .................. 10-2016-0064207

(51) Int. Cl.
| | |
|---|---|
| *F16H 45/02* | (2006.01) |
| *F16F 15/121* | (2006.01) |
| *F16H 41/24* | (2006.01) |
| *F16D 13/52* | (2006.01) |
| *F16D 13/68* | (2006.01) |
| *F16F 15/123* | (2006.01) |

(52) U.S. Cl.
CPC ............ *F16H 45/02* (2013.01); *F16D 13/52* (2013.01); *F16D 13/683* (2013.01);
(Continued)

(58) Field of Classification Search
CPC .. F16H 45/02; F16H 41/24; F16H 2045/0284; F16H 2045/0226;
(Continued)

(56) References Cited

U.S. PATENT DOCUMENTS

| | | | |
|---|---|---|---|
| 7,287,634 B2 | 10/2007 | Agner et al. | |
| 8,978,853 B2 * | 3/2015 | Tomiyama | F16H 45/02 192/3.28 |

(Continued)

FOREIGN PATENT DOCUMENTS

| | | |
|---|---|---|
| JP | 2011-169442 A | 9/2011 |
| JP | 2014-199141 A | 10/2014 |

(Continued)

OTHER PUBLICATIONS

International Search Report dated Feb. 14, 2017 in PCT/KR2016/007587 filed on Jul. 13, 2016.

*Primary Examiner* — David J Hlavka
(74) *Attorney, Agent, or Firm* — Oblon, McClelland, Maier & Neustadt, L.L.P.

(57) ABSTRACT

The present invention discloses a torque converter for a vehicle in which the number of components is reduced and stability is improved in a long-travel torsional damper structure having springs that operate at two stages.

The torque converter for a vehicle according to the present invention includes a front cover, an impeller, a turbine, a reactor, a lock-up clutch, and a torsional damper, and the lock-up clutch includes a clutch drum which is coupled to the front cover, multiple first friction plates which are coupled to the clutch drum, second friction plates which are disposed between the multiple first friction plates, and a retaining plate which has an extending drum portion to which the second friction plate are coupled and supports springs provided on the torsional damper.

4 Claims, 5 Drawing Sheets

(52) U.S. Cl.
CPC ...... *F16F 15/121* (2013.01); *F16F 15/12353* (2013.01); *F16H 41/24* (2013.01); *F16H 2045/0226* (2013.01); *F16H 2045/0284* (2013.01)

(58) Field of Classification Search
CPC .............. F16F 15/121; F16F 15/12353; F16F 2238/024; F16F 2236/08; F16F 15/1216; F16D 13/683; F16D 13/52
See application file for complete search history.

(56) References Cited

U.S. PATENT DOCUMENTS

| | | | | |
|---|---|---|---|---|
| 2013/0175131 | A1* | 7/2013 | Iwashita | ................ F16H 41/30 |
| | | | | 192/3.29 |
| 2016/0047434 | A1 | 2/2016 | Sugiyama et al. | |
| 2016/0169358 | A1 | 6/2016 | Kawahara et al. | |
| 2016/0215831 | A1* | 7/2016 | Ito | ....................... F16D 25/0638 |
| 2017/0138413 | A1* | 5/2017 | Ito | ........................... F16D 25/12 |
| 2017/0175866 | A1* | 6/2017 | Basin | ..................... F16D 13/52 |

FOREIGN PATENT DOCUMENTS

| | | |
|---|---|---|
| KR | 10-2005-0065354 A | 6/2005 |
| KR | 10-2011-00461 49 A | 5/2011 |
| KR | 10-2011-0046152 A | 5/2011 |
| KR | 10-2014-0009849 A | 1/2014 |
| KR | 10-1377254 B1 | 3/2014 |
| KR | 10-2015-0135429 A | 12/2015 |
| KR | 10-2016-0032091 A | 3/2016 |

\* cited by examiner

TORQUE CONVERTER FOR VEHICLE

TECHNICAL FIELD

The present invention relates to a torque converter for a vehicle in which the number of components is reduced and stability is improved in a long-travel torsional damper structure having springs that operate at two stages.

BACKGROUND ART

In general, a torque converter is installed between an engine and a transmission of a vehicle and serves to transmit driving power of the engine to the transmission by using a fluid. The torque converter includes an impeller which rotates by being supplied with the driving power of the engine, a turbine which rotates by oil discharged from the impeller, and a reactor (also called a 'stator') which directs a flow of oil, which returns back to the impeller, in a rotation direction of the impeller in order to increase a rate of change in torque.

If a load applied to the engine is increased, power transmission efficiency of the torque converter may deteriorate, and therefore, the torque converter has a lock-up clutch (also called a 'damper clutch') which is a means for directly connecting the engine and the transmission. The lock-up clutch is disposed between the turbine and a front cover directly connected to the engine and enables rotational power of the engine to be transmitted directly to the turbine.

The lock-up clutch includes a piston that may be moved in an axial direction of a turbine shaft. Further, a friction member, which comes into friction contact with the front cover, engages with the piston. Further, a torsional damper, which may absorb impact and vibration being applied in a rotation direction of the shaft when the friction member engages with the front cover, is coupled to the piston.

In particular, because components of the lock-up clutch and the torsional damper are connected to one another by riveting, the number of components is increased, and as a result, there are problems in that the number of manufacturing processes is increased during automatic assembling processes and thus productivity deteriorates. In addition, in the related art, there is a problem in that the increase in number of components causes an increase in costs.

DISCLOSURE

Technical Problem

The present invention has been made in an effort to provide a torque converter for a vehicle, in which the number of components for connecting a lock-up clutch and a damper clutch in a long-travel damper for implementing low rigidity is minimized, thereby reducing the number of manufacturing processes.

Technical Solution

An exemplary embodiment of the present invention provides a torque converter for a vehicle, including: a front cover; an impeller which is coupled to the front cover and rotates together with the front cover; a turbine which is disposed at a position facing the impeller; a reactor which is positioned between the impeller and the turbine and changes a flow of oil flowing from the turbine to the impeller; a lock-up clutch which directly connects the front cover and the turbine; and a torsional damper which is coupled to the lock-up clutch, in which the lock-up clutch includes: a clutch drum which is coupled to the front cover; multiple first friction plates which are coupled to the clutch drum; second friction plates which are disposed between the multiple first friction plates; and a retaining plate which has an extending drum portion to which the second friction plates are coupled, and supports springs provided on the torsional damper.

The torsional damper may include: first springs and second springs which are disposed on the retaining plate in a circumferential direction; a connecting plate which is fitted between the first springs and the second springs and transmits rotational force, which is transmitted through the first springs, to the second springs; a cover plate which is coupled to the retaining plate; and a driven plate which is coupled to the turbine and supports one side of the second spring.

The extending drum portion may be disposed in an axial direction, the retaining plate may have an extending spring support portion which extends in a radial direction from the extending drum portion, and the extending spring support portion may have spring fitting grooves into which the springs are fitted.

The extending drum portion may have groove portions into which the second friction plates are fitted in a direction parallel to a shaft.

Advantageous Effects

The exemplary embodiment of the present invention provides the retaining plate having the extending drum portion into which some of the multiple friction plates of the lock-up clutch are fitted, such that the retaining plate shares components with the lock-up clutch and the torsional damper, and as a result, the number of components may be reduced, the manufacturing process may be simplified, and productivity may be improved.

MODE FOR INVENTION

Figure 1:
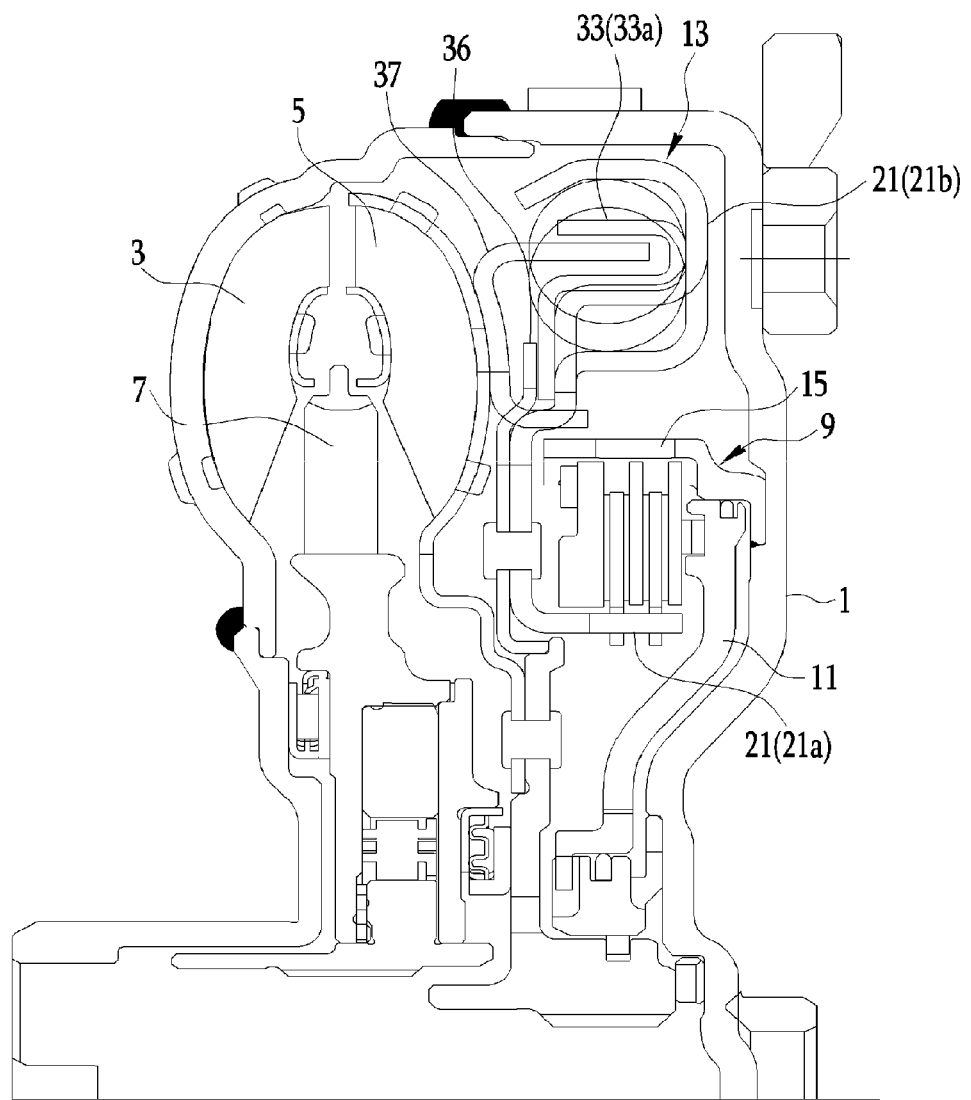
FIG. 1 is a half cross-sectional view illustrating a torque converter cut in an axial direction for explaining an exemplary embodiment of the present invention.

Hereinafter, exemplary embodiments of the present invention will be described in detail with reference to the accompanying drawings so that those skilled in the technical field to which the present invention pertains may easily carry out the exemplary embodiment. However, the present invention may be implemented in various different ways, and is not limited to exemplary embodiments described herein. A part irrelevant to the description will be omitted in the drawings to clearly describe the present invention, and the same or similar constituent elements will be designated by the same reference numerals throughout the specification.

FIG. 1 is a half cross-sectional view for explaining an exemplary embodiment of the present invention and illustrates a torque converter for a vehicle.

A torque converter for a vehicle according to an exemplary embodiment of the present invention includes a front cover 1 which is connected to a crank shaft of an engine and rotates, an impeller 3 which is connected to the front cover 1 and rotates together with the front cover 1, a turbine 5 which is disposed at a position facing the impeller 3, and a reactor 7 (also called a 'stator') which is positioned between the impeller 3 and the turbine 5, changes a flow of oil flowing from the turbine 5, and delivers the oil to the impeller 3. The reactor 7, which delivers the oil to the impeller 3, has the same rotation center as the front cover 1. Further, a lock-up clutch 9, which is used as a means for directly connecting the engine and a transmission, is disposed between the front cover 1 and the turbine 5.

The lock-up clutch 9 has a piston 11 having an approximately circular plate shape. Further, the piston 11 may be rotated in a center direction of a shaft and disposed to be movable in an axial direction.

Meanwhile, a torsional damper 13, which serves to absorb torsional force applied in the rotation direction of the shaft and attenuate vibration, is coupled to the lock-up clutch 9.

The lock-up clutch 9 applied to the exemplary embodiment of the present invention may be configured as a multi-plate clutch.

That is, the lock-up clutch 9 includes a clutch drum 15 which is coupled to the front cover 1, multiple first friction plates 17 and 19, a retaining plate 21 which has an extending drum portion 21a, and multiple second friction plates 23 and 25.

Figure 2:
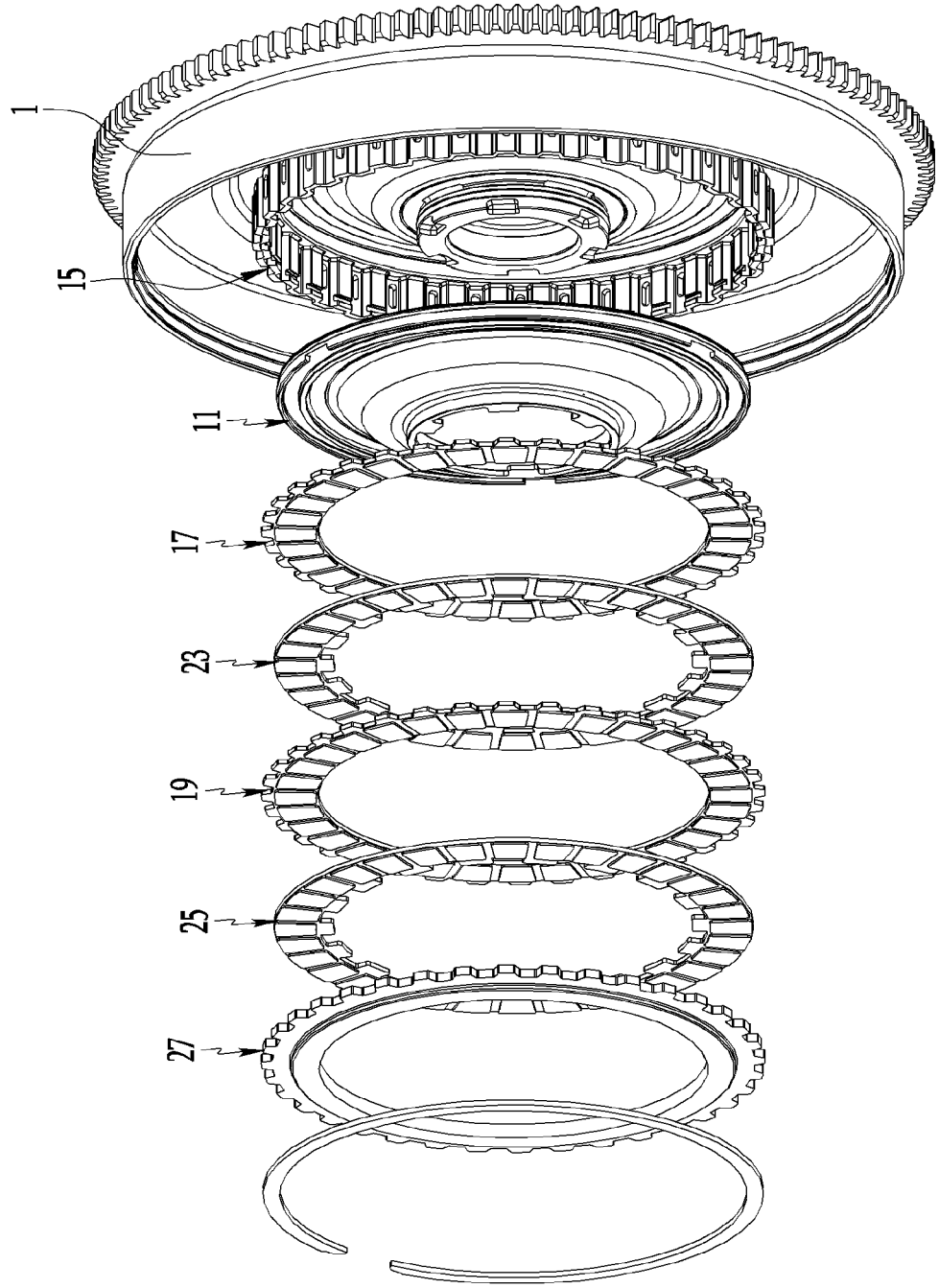
FIG. 2 is an exploded perspective view illustrating a structure of a lock-up clutch applied to the exemplary embodiment of the present invention.

The clutch drum 15 is coupled to the front cover 1, has a cylindrical shape, and is disposed in the axial direction. Further, the clutch drum 15 has fitting holes formed in an inner circumferential surface of the clutch drum 15 so that the multiple first friction plates 17 and 19 may be fitted into the fitting holes. The first friction plates 17 and 19 have fitting protruding portions formed on an outer circumferential surface of the first friction plates 17 and 19. The fitting protruding portions are inserted into the fitting holes and may be moved in the axial direction (see FIGS. 1 and 2).

Each of the fitting holes of the clutch drum 15 has an opening at one side in the axial direction, and the fitting holes are penetratively formed in a radial direction based on the shaft. The first friction plates 17 and 19 may be moved in the axial direction by the piston 11. The extending drum portion 21a of the retaining plate 21 is disposed at a position spaced apart from the clutch drum 15 at a predetermined interval.

The retaining plate 21 includes the extending drum portion 21a and an extending spring support portion 21b.

The extending drum portion 21a is provided in the axial direction and has a smaller diameter than the clutch drum 15. The extending drum portion 21a also have grooves into which the multiple second friction plates 23 and 25 may be fitted. The second friction plates 23 and 25 are coupled to the extending drum portion 21a and may be moved in the axial direction. Further, the second friction plates 23 and 25 are disposed between the first friction plates 17 and 19.

In the exemplary embodiment of the present invention, groove portions may be formed in the extending drum portion 21a, and fitting protruding portions formed on inner circumferential surfaces of the second friction plates 23 and 25 may be fitted into the groove portions in the axial direction.

Meanwhile, a third friction plate 27 may be coupled to the clutch drum 15. Fitting protruding portions are also formed on an outer circumferential surface of the third friction plate 27 and may be fitted into the fitting holes of the clutch drum 15. The third friction plate 27 may provide reaction force against the first friction plates 17 and 19 and the second friction plates 23 and 25. That is, when the piston 11 presses the first friction plates 17 and 19 in the axial direction, the first friction plates 17 and 19 and the second friction plates 23 and 25 are moved in the axial direction, and the third friction plate 27 provides reaction force against the first friction plates 17 and 19 and the second friction plates 23 and 25.

Meanwhile, a snap ring, which restricts an axial movement of the third friction plate 27, may be coupled to the clutch drum 15.

Figure 3:
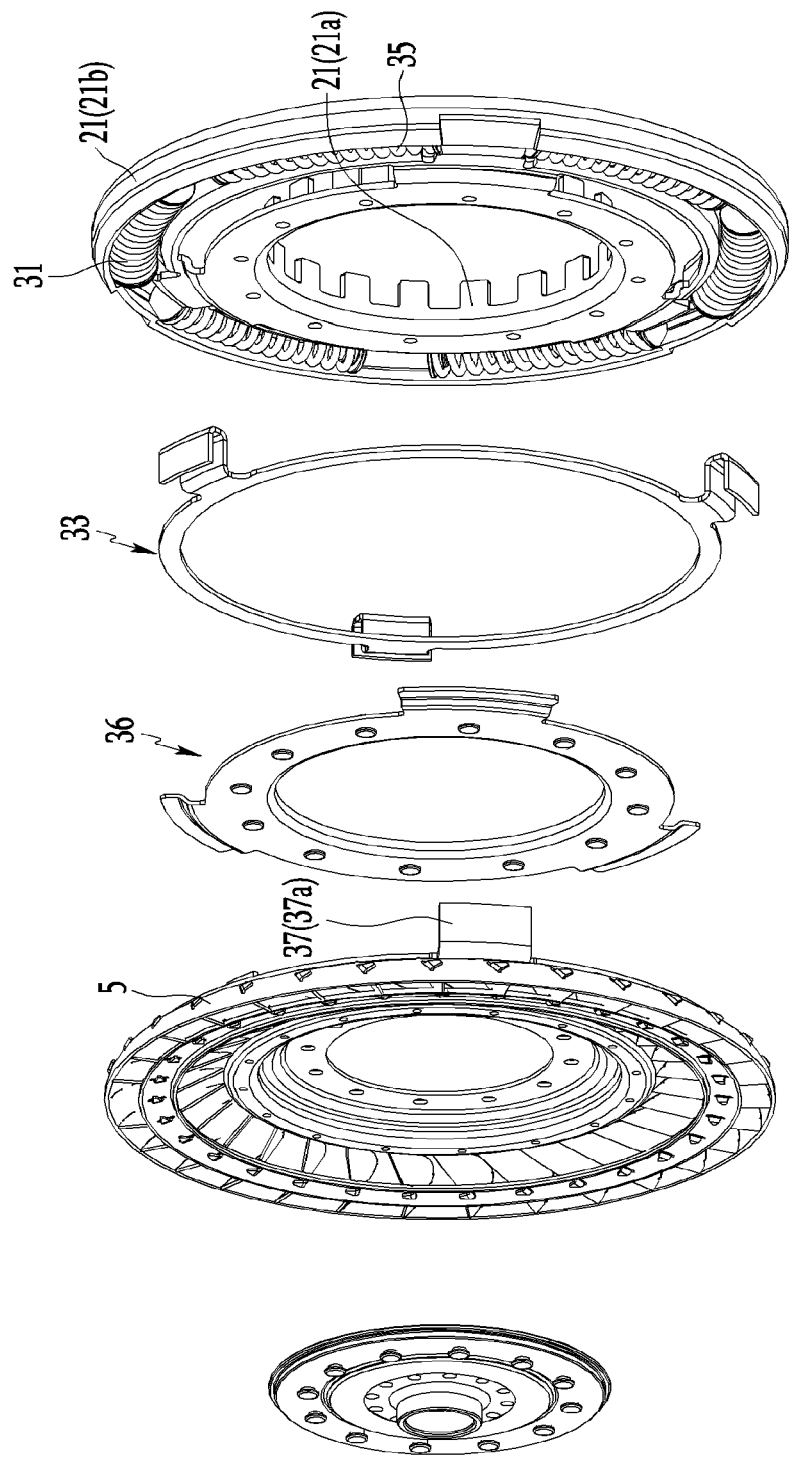
FIG. 3 is an exploded perspective view illustrating a state in which a main part of a torsional damper applied to the exemplary embodiment of the present invention is disassembled.

As illustrated in FIGS. 1 and 3, the torsional damper 13 includes the extending spring support portion 21b of the retaining plate 21, first springs 31, a connecting plate 33, second springs 35, and a driven plate 37. In addition, a cover plate 36, which is coupled to the extending spring support portion 21b of the retaining plate 21, may be coupled to the torsional damper 13 by riveting.

The extending spring support portion 21b of the retaining plate 21 includes spring fitting grooves 21c into which the first springs 31 and the second springs 35 are fitted. The multiple spring fitting grooves 21c are disposed in a circumferential direction. Further, an outer circumferential portion of the extending spring support portion 21b of the retaining plate 21 is shaped to be bent to surround the first springs 31 and the second springs 35.

The first springs 31 are disposed on the retaining plate 21 at a predetermined interval in the circumferential direction. In addition, the multiple second springs 35 are disposed on the retaining plate 21 in the circumferential direction between the multiple first springs 31.

The multiple first springs 31 and the multiple second springs 35 may provide elastic force in the rotation direction, thereby absorbing vibration and impact.

The connecting plate 33 is fitted into portions where the first springs 31 and the second springs 35 face one another. The connecting plate 33 may serve to receive elastic force of the first springs 31 and transmit the elastic force to the second springs 35. That is, the connecting plate 33 has bent portions 33a which is partially bent in a direction parallel to the shaft. Further, the bent portions 33a of the connecting plate 33 are disposed between the first springs 31 and the second springs 35.

Therefore, driving power, which is transmitted through the first springs 31, may be transmitted to the connecting plate 33 and then transmitted to the second springs 35.

This structure may implement a long-travel damper for implementing low rigidity of the torsional damper 13.

Figure 4:
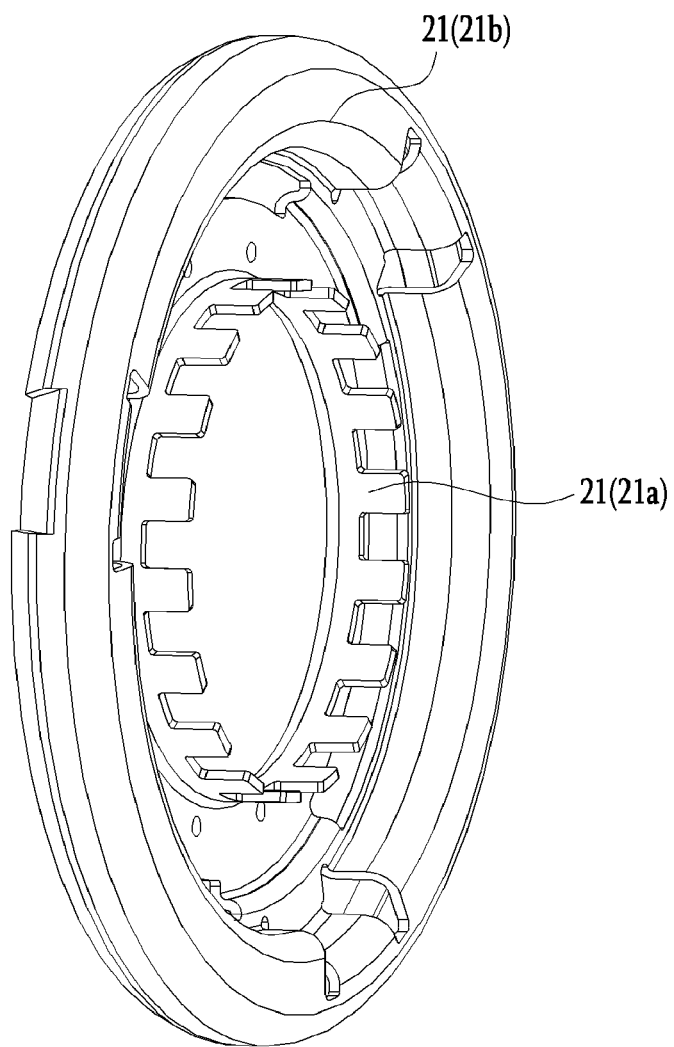
FIG. 4 is a perspective view illustrating a retaining plate which is a main part of the exemplary embodiment of the present invention.

The driven plate 37 is coupled to the turbine 5 and may receive the driving power through the second springs 35. As illustrated in FIGS. 3 and 4, the driven plate 37 includes multiple support portions 37a, each of which supports one end of the second spring 35.

The support portions 37a of the driven plate 37 are disposed at predetermined intervals and each may support one end of the second spring 35.

An operation of the exemplary embodiment of the present invention configured as described above will be described below in detail.

First, when the lock-up clutch 9 does not operate, the driving power of the engine is transmitted to the impeller 3 through the front cover 1. Further, the driving power transmitted to the impeller 3 is transmitted to a spline hub through the turbine 5 and then transmitted to the transmission through an input shaft of the transmission. In this process, the torsional damper 13 may absorb vibration and impact in the rotation direction through the driven plate 37 connected to the turbine 5.

Figure 5:
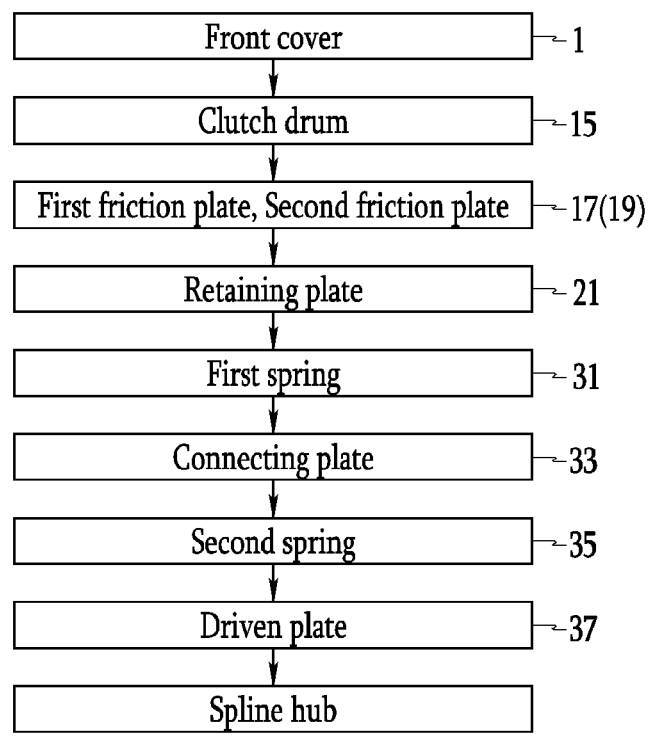
FIG. 5 is a power transmission flowchart for explaining a process of transmitting driving power of an engine when the lock-up clutch of the exemplary embodiment of the present invention operates.

As illustrated in FIG. 5, when the lock-up clutch 9 operates, the driving power of the engine is transmitted to the clutch drum 15 through the front cover 1. Next, the driving power of the engine is transmitted to the extending drum portion 21a of the retaining plate 21 through the first friction plates 17 and 19 and the second friction plates 23 and 25. The driving power of the engine, which is transmitted to the extending drum portion 21a of the retaining plate 21, is transmitted to the extending spring support portion 21b of the retaining plate 21 integrally formed with the extending drum portion 21a. The driving power, which is transmitted to the extending spring support portion 21b of the retaining plate 21, is transmitted to the connecting plate 33 through the first springs 31. Further, the driving power, which is transmitted to the connecting plate 33, is transmitted to the second springs 35. In this case, vibration and impact in the rotation direction are absorbed by the first springs 31 and the second springs 35. In addition, the first springs 31 and the second springs 35 sequentially provide elastic force, thereby implementing low rigidity.

Further, the driving power of the engine, which is transmitted to the second springs 35, is transmitted to the driven plate 37. The driving power, which is transmitted to the driven plate 37, is transmitted to the spline hub through the turbine 5 and then transmitted to the transmission through the input shaft of the transmission.

Therefore, in the exemplary embodiment of the present invention, the driving power of the lock-up clutch 9 may be transmitted to the torsional damper 13 through the single retaining plate 21, such that the number of components may be reduced. In the exemplary embodiment of the present invention, a component for connecting the lock-up clutch 9 and the torsional damper 13 may be omitted, such that the number of manufacturing processes may be reduced. The exemplary embodiment of the present invention may contribute to simplification of the process of manufacturing the torque converter which is configured as an automation process.

In addition, the exemplary embodiment of the present invention has an advantage in that the number of components is reduced such that the components may be easily managed and manufacturing costs may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A torque converter for a vehicle, comprising:
    a front cover;
    an impeller which is coupled to the front cover and rotates together with the front cover;
    a turbine which is disposed at a position facing the impeller;
    a reactor which is positioned between the impeller and the turbine and changes a flow of oil flowing from the turbine to the impeller;
    a lock-up clutch which directly connects the front cover and the turbine;
    a torsional damper which is coupled to the lock-up clutch; and
    a retaining plate including an extending drum portion and an extending spring support portion supporting springs provided on the torsional damper,
    wherein the lock-up clutch includes:
        a clutch drum which is coupled to the front cover;
        multiple first friction plates which are coupled to the clutch drum;
        second friction plates which are disposed between the multiple first friction plates and coupled to the extending drum portion,
    wherein the extending drum portion is disposed in an axial direction and radially inside of the clutch drum,
    wherein the extending spring support portion is integrally formed with the extending drum portion and extends in a radial direction from the extending drum portion, and
    wherein the extending spring support portion includes spring fitting grooves into which the springs are fitted.

2. The torque converter of claim 1, wherein:
    the torsional damper includes:
        first springs and second springs which are disposed on the retaining plate in a circumferential direction;
        a connecting plate which is fitted between the first springs and the second springs and transmits rotational force, which is transmitted through the first springs, to the second springs;
        a cover plate which is coupled to the retaining plate; and
        a driven plate which is coupled to the turbine and supports one side of the second spring.

3. The torque converter of claim 1, wherein:
    the extending drum portion includes groove portions into which the second friction plates are fitted in a direction parallel to a shaft.

4. The torque converter of claim 1, wherein:
    the extending drum portion extends in the axial direction from an inner circumferential surface of the retaining plate.

* * * * *